Feb. 21, 1939.    S. COMPARATO    2,148,260
THREE-DIMENSIONAL PROJECTION SYSTEM
Filed Aug. 28, 1935
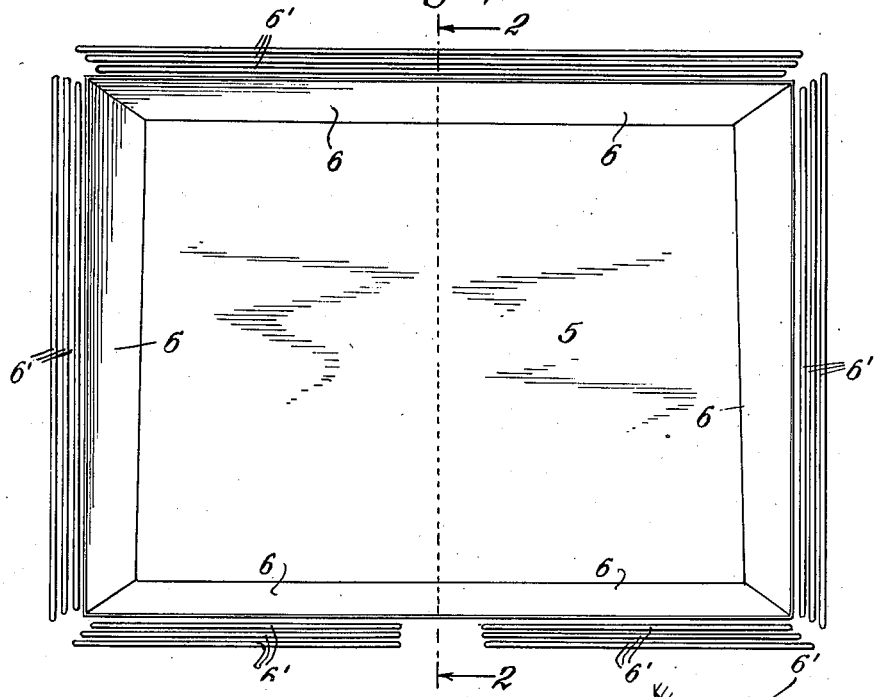
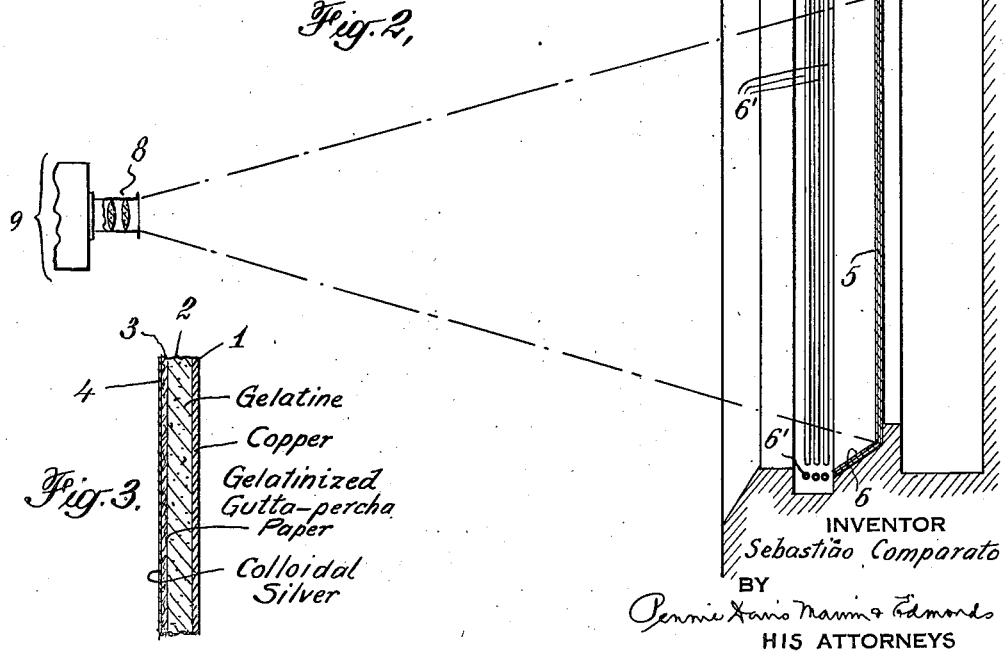

Patented Feb. 21, 1939

2,148,260

UNITED STATES PATENT OFFICE 2,148,260

THREE-DIMENSIONAL PROJECTION SYSTEM

Sebastião Comparato, Sao Paulo, Brazil

Application August 28, 1935, Serial No. 38,184
In Brazil April 26, 1935

6 Claims. (Cl. 88—24)

This invention relates to picture-projection, and its chief object is to provide an improved method of, and means for, projecting pictures to give an improved stereoscopic illusion either in moving, or stationary, pictures.

A particular object of the invention is to provide improvements of this sort whereby the tendency of the subsistent projection-systems to cause eye-strain will be minimized, if not totally eliminated.

Another particular object of the present invention is to eliminate the usual crepuscular glow in moving-picture theatres due to light diffusing all over the room from the shaft of light between the projection-booth and the screen, said shaft also standing out glaringly and annoyingly against the darkness of the theatre and made visible by means of floating motes, etc., in the air.

A further particular object of the invention is to provide means for creating the illusion of the objects on the screen being self-generating sources of light and not mere reflectors of light, thereby eliminating the usual appearance they have of plainly receiving light from the projector, and instead making it appear that the rays come only from the scene and objects themselves, yet in which the intensity of the projection-light will not be greater than usual and will on the contrary be weaker than usual.

Still another object of the invention is to provide a system of this sort which will be fully stereoscopic and quite brilliant, yet in which, nonetheless, all the surface detail, contrast, and half-tones which so greatly enhance the illusion of rotundity and solidity will be preserved, instead of destroyed as by the usual processes.

The other objects and advantages of the invention will be made manifest as this specification proceeds.

One embodiment of means for carrying out the present invention is shown, by way of example only, in the accompanying drawing, but the invention is limited in its embodiments only by the scope of the sub-joined claims. In the drawing, Fig. 1 is a front-elevation of the screen-component of the system;

Fig. 2 is a vertical cross-section on line 2—2 of Fig. 1, also showing the projector-component of the screen, and Fig. 3 is a fragmentary, detailed, enlarged cross-section of the screen, showing its structure and composition.

Ordinarily when a moving-picture film, or a stationary diapositive photograph, are projected, the images have height and width but no thickness at all. In order to go about giving the image thickness (that is, making it three-dimensional), it is necessary to consider that the impression one gets from looking at a scene is not purely the one received directly from the eye, but from the eye via a complex neuro-optical transmission system which corrects the "image" and transforms it, instead, into an "impression". For example, if one regards a line of trees, in vista, they "seem" to decrease in height in the distance, but reason tells us that they are really all of exactly the same height, and thus we know that the apparent image is merely an illusion. Thus it is that when we view a thing, conflict always arises between what our eye tells us and what our experience teaches us is the real fact. This conflict between the linear perspective made by the eye and the linear perspective of reality, taken by a camera and projected by a projector, is due mainly to the fact that the stationary eye takes in only a narrow angle of vision; to get all in, it moves, unconsciously, about a point, forming on the concave retina-region a series of calottes or concave, spherical caps, in doing which it has a great power of accommodation of perception in the direction of depth or parallel to the line of sight; whereas the camera and projector objective-lens possess superlative power in the direction at right angles, namely, for width, which the human eye possesses but weakly. Thus, the anastigmatic lens on a camera takes in everything anywhere in front of it, all at once, and all equally clearly, and the corresponding anastigmatic lens in a projector acts in the same manner in projecting these pictures; whereas, a simple, uncorrected, converging lens produces images which, having distortion, chromatic aberration, and astigmatic aberration, corresponding exactly to that of the human eye looking at the same scene, produces an image more in accord with the action of the human eye.

Again, in addition to these facts concerning linear perspective, etc., in nature there is a space, or aerial, perspective due to which a color varies in tint or tone with distance, giving rise to a "color-perspective", as well as to gradation of visibility, with distance and depth of focus, some colored objects becoming colorless at a distance and all toning in tint. If the atmosphere were a pure gas, the eye would perceive objects that are far away with almost nearby clearness and in their exact true colors, but the air contains in suspension, water-vapor, dust, etc., which, being of a density different from that of the air, deflect the rays by refraction and reflection and produce considerable diffusion. The consequence is that objects at a distance appear hazy and colorless. This aerial perspective, together with color perspective, giving tint-change due to distance, are the factors usually missing from ordinary projections, along with their lack of the third dimension.

In accomplishing the general object of the present invention, I provide a screen-group comprising a metallic curtain 1, preferably of copper or copper alloy, subjected to a process of uniform polishing rendering it a substantially perfect reflector. The polished surface bears a uniform, but thickish, layer of purest gelatine 2, adhering perfectly thereto and hardened. This layer of gelatine, before it is hardened, is covered with a skin of transparent gelatinized rubber or gutta-percha paper 3. The layer 3 bears a coating of a solution of colloidal silver 4. The final product has a surface (and interior thickness, back to the copper) which is light-mottled and iridescent and opalescent, closely resembling the surface lighting and coloring, etc., of mother-of-pearl.

The major or central portion 5 of the screen is of rectangular form and is surrounded by integral extensions, in the form of concave flanges or oblique wings 6, of the same material, the resultant object having the appearance of a stage.

Thus the images are thrown onto a surface having depth in three layers, the first being silver in color and colloidal in structure but transparent or translucent, wherefrom the rays, passing through this layer, undergo a very slight refraction and strike the second, or gelatinized gutta-percha layer, which is of an amber color, and therein undergo refraction of different direction and degree, and some are reflected to the third layer of pure gelatine. But these latter rays have, by then, been rid of their blue, violet and ultra-violet rays by the layers they have passed through, and are ultimately reflected back towards the audience from the polished metal or copper alloy layer. This copper layer, however, has the power of absorbing, totally, all the ultra-violet, violet, and blue rays, but emits, by reflection, all the rays ranging from the yellow and through the relatively harmless infra-red rays. The copper layer, in spite of this absorbing power, reflects back about 90% of all the visible wave-lengths it receives. From this copper surface, the rays rebound back through the layers, and undergo refraction and reflection in and from layer to layer. They also meet incoming new rays from the projector and set up interference, and, as the lenses used are uncorrected and give rise to chromatic aberration, the phenomenon of stereopticity is set up, the final image having a rotund, stand-out, three-dimensional appearance.

The phenomena of interference, refraction and reflection on the screen are also enhanced by the combination with it of two converging uncorrected bi-convex lenses 8, and including in the category of suitable materials, soda-glass, each having the same degree of dioptry and being made of the same material. The degree of dioptry of course is variable in accordance with the size which it is desired to give the images projected, and with the distance between the projector and the screen.

Around the front face of the screen, at each of the edges, diffuse-illuminators 6, here shown as inert-gas tubes, are placed, and are so constructed as to throw on the screen, light including every major color in the solar spectrum. They compensate and correct, to a sufficient degree, for the distortion, chromatic aberration, and astigmatic aberration of the uncorrected lenses employed in the present combination.

I also provide means for obviating the eye-strain concomitant to the usual projection. Present-day films are usually projected with a very strong source of light, ranging from about 4000 to about 8000 foot-candles. This very intense light is reflected directly into the spectators' eyes from screens of a type that also reflect infra-red and ultra-violet rays, very harmful to the eye, and even though the eye segregates rays at these extremities and does not "see" them, the modern systems endeavor to render the image more brilliant and do so at the expense of the wave-lengths between the two extremities, thus increasing the ultra and infra rays, to the great detriment of the eye, which responds by means of the physiological functioning known as "accommodation". The result, eventually at least, is a headache, congestion of the sclerotic, and exophthalmia.

In my system, however, by virtue of, and consequent upon, the combination of the novel screen and the novel lenses, etc., I am enabled to dispense with the usual high-intensity light-sources, of the kind comprising an electric-arc, parabolic reflectors, and special brilliant-light carbons and D. C., and I employ in my special projector only a very minute light-source 9, preferably about $\frac{1}{10}$ the candlepower of the usual one. The light source is, furthermore, instead of being glaring white in color, made to emit light which appears as a yellowish light, and thereby produces, on the whole, the most readily visible and easiest light known to the human eye. This light containing approximately yellow radiations will also contain a certain percentage of other radiations.

In the present invention, the light-source is of small intensity and of a yellowish color, instead of the usual white, the result being that, in combination with the novel screen and lenses of the present invention, the image has full "detail" and definition, yet is quite brilliant and visible.

I claim:

1. In a three-dimensional projection system, a projector having a source of predominantly yellow light, and an uncorrected objective, a screen including a plate having a reflecting surface composed primarily of copper and an opalescent transparent, uniformly thick and optically anisotropic coating on said plate, and means for indirectly lighting the peripheral surface of said screen with polychromatic light.

2. In a device as set forth in claim 1 in which the coating is comprised of material to substantially filter all the radiations ranging from ultra-violet color to blue.

3. In a device as set forth in claim 1 in which the reflecting plate has one uniformly polished face.

4. In a device as set forth in claim 1 in which the means for indirectly lighting the peripheral surface of said screen with polychromatic light includes tubes containing inert gases.

5. In a three-dimensional projecting system, a projector having a source of predominantly yellow light and an uncorrected objective, a screen including a plate having a reflecting surface composed primarily of copper and an opalescent transparent, uniformly thick and optically anistropic coating, means for indirectly lighting the periphery of said screen with polychromatic light, said coating comprised of material to substantially filter all the radiations from ultraviolet color to blue and said reflecting plate having one uniformly polished face and further having the properties of absorbing the remaining radiations from ultra-violet color to blue and of reflecting approximately 90% of the visible radiations.

6. A screen for a three-dimensional projection system including a plate having a reflecting surface composed primarily of copper, a transparent, uniformly thick and optically anistropic coating on said plate comprising a layer of gelatine set on the plate, a layer of gelatinized gutta-percha paper on the layer of gelatine, and a layer of colloidal silver set on the layer of gelatinized gutta-percha paper.

SEBASTIÃO COMPARATO.